Sept. 2, 1952  B. H. WOODRUFF  2,608,833
FROZEN CUSTARD MACHINE
Filed July 29, 1949  2 SHEETS—SHEET 1

INVENTOR.
Ben H. Woodruff,
BY
Foorman L. Mueller
Atty.

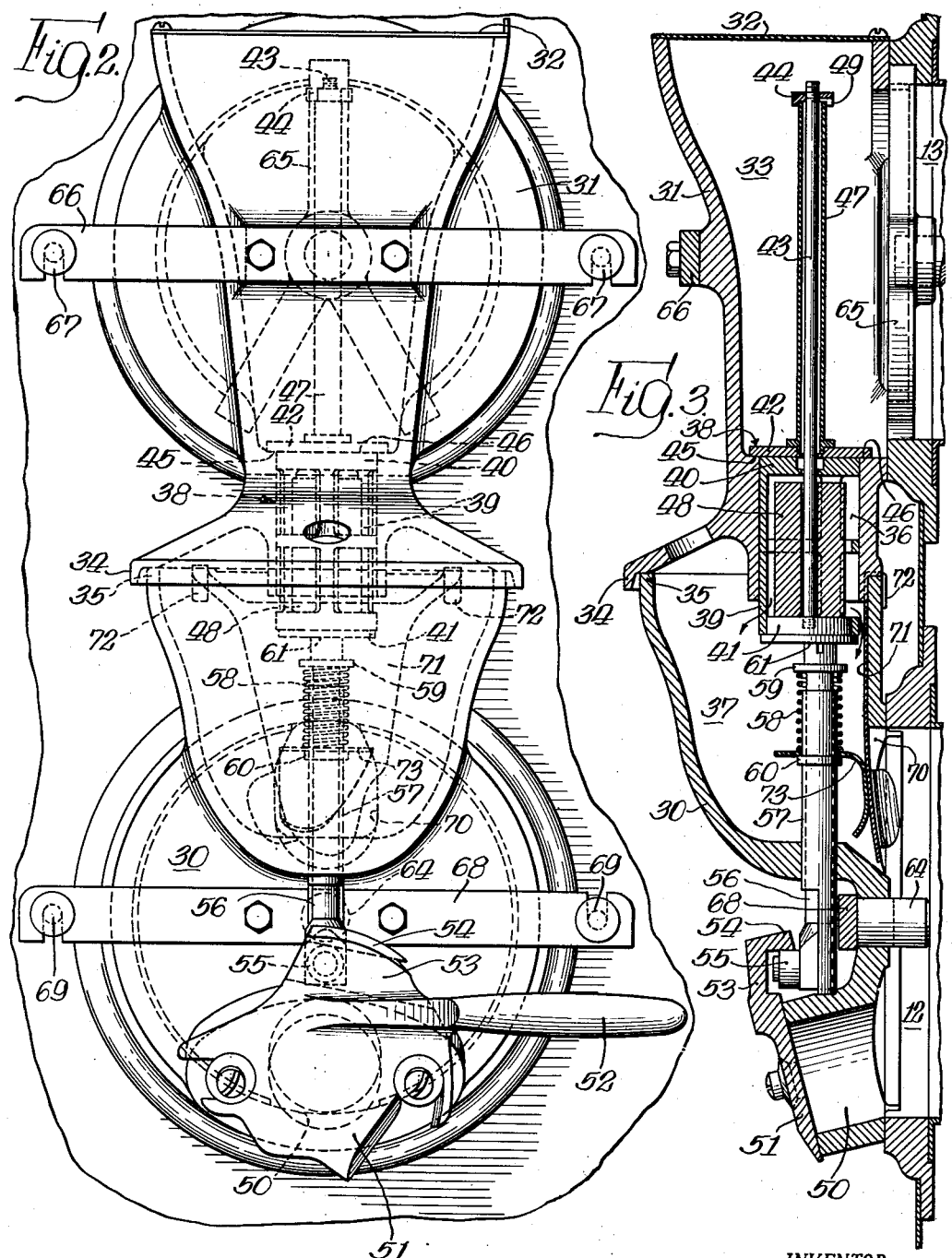

Patented Sept. 2, 1952

2,608,833

UNITED STATES PATENT OFFICE 2,608,833

FROZEN CUSTARD MACHINE

Ben H. Woodruff, Chicago, Ill.

Application July 29, 1949, Serial No. 107,520

8 Claims. (Cl. 62—114)

This invention relates generally to machines for making frozen custard, soft ice-cream, or other frozen products, and more particularly to such machines which operate automatically and continuously at a rate depending upon the amount of frozen mixture which is withdrawn therefrom.

Machines for the making and vending of frozen custard, soft ice-cream, and other frozen products are in general use in relatively large numbers. In the past, these machines have been of two types, "one-shot" or "batch" machines in which a given amount of mixture is frozen and then all used up, or "continuous" machines in which a continuous stream of custard is frozen. The "one-shot" machines must be refilled after the frozen mixture is all used up, thereby causing a delay due to the time required for the mixture to freeze. This requires the use of at least two machines to keep each type of frozen product always available. The "continuous" machines are large and expensive and in addition are not flexible enough to take care of situations where smalls quantities of frozen mixtures are required. As storage of most types of frozen mixtures results in deterioration of the quality thereof, this is obviously undesirable.

In my copending application, Serial No. 52,933, filed October 5, 1948, subject: Frozen Custard Machine, now Patent No. 2,523,853 there is disclosed a simple machine which is in general like the machines of the "batch" type in which a continuous supply of a frozen product can be provided. In this machine, the rate at which the custard is made is automatically adjusted to correspond to the amount of custard used at any time. The present invention is an improvement of the machine described and claimed in my previous application referred to above, in which improved means are provided for storing and conditioning the mixture to be frozen prior to introduction thereof into the freezing chamber of the machine. In the following specification the term "frozen custard" is intended to include soft ice-cream or other frozen products.

It is an object of the present invention, therefore, to provide an improved machine for freezing custard, or other frozen products which operates automatically and continuously to provide the product at any desired rate.

A further object of this invention is to provide a frozen custard machine having a refrigerated storage chamber for maintaining a relatively large supply of mixture in proper condition before it is frozen.

A still further object of this invention is to provide a frozen custard machine having a refrigerated storage chamber which may have an agitator therein for reconstituting or preparing the mixture to be frozen.

A feature of this invention is the provision of a machine for making frozen custard or the like, having a storage chamber and a freezing chamber both of which are cooled by a common refrigerating system, with the freezing chamber positioned below the storage chamber so that mixture can be easily provided from the storage chamber to the freezing chamber.

A further feature of this invention is the provision of a refrigerated storage chamber in a freezing machine including an agitator which can be operated to mix the various ingredients to provide the desired freezing mixture. This operation has been generally termed "reconstitution" of the mix.

A still further feature of this invention is the provision of a frozen custard machine having a cabinet for enclosing a freezing chamber and a storage chamber and cover plates for the chambers including provisions for withdrawing frozen mixture from the freezing chamber and at the same time automatically providing mixture from the storage chamber to the refrigerating chamber.

Further objects, features and advantages will be apparent from a consideration of the following description taken in connection with the accompanying drawings in which:

Fig. 2 is a front view of the freezing machine illustrating the covers for the storage and freezing chambers; and Fig. 3 is a cross-sectional view showing the detailed construction of the cover members and the gate and valve mechanism included therewith.

Figure 1:
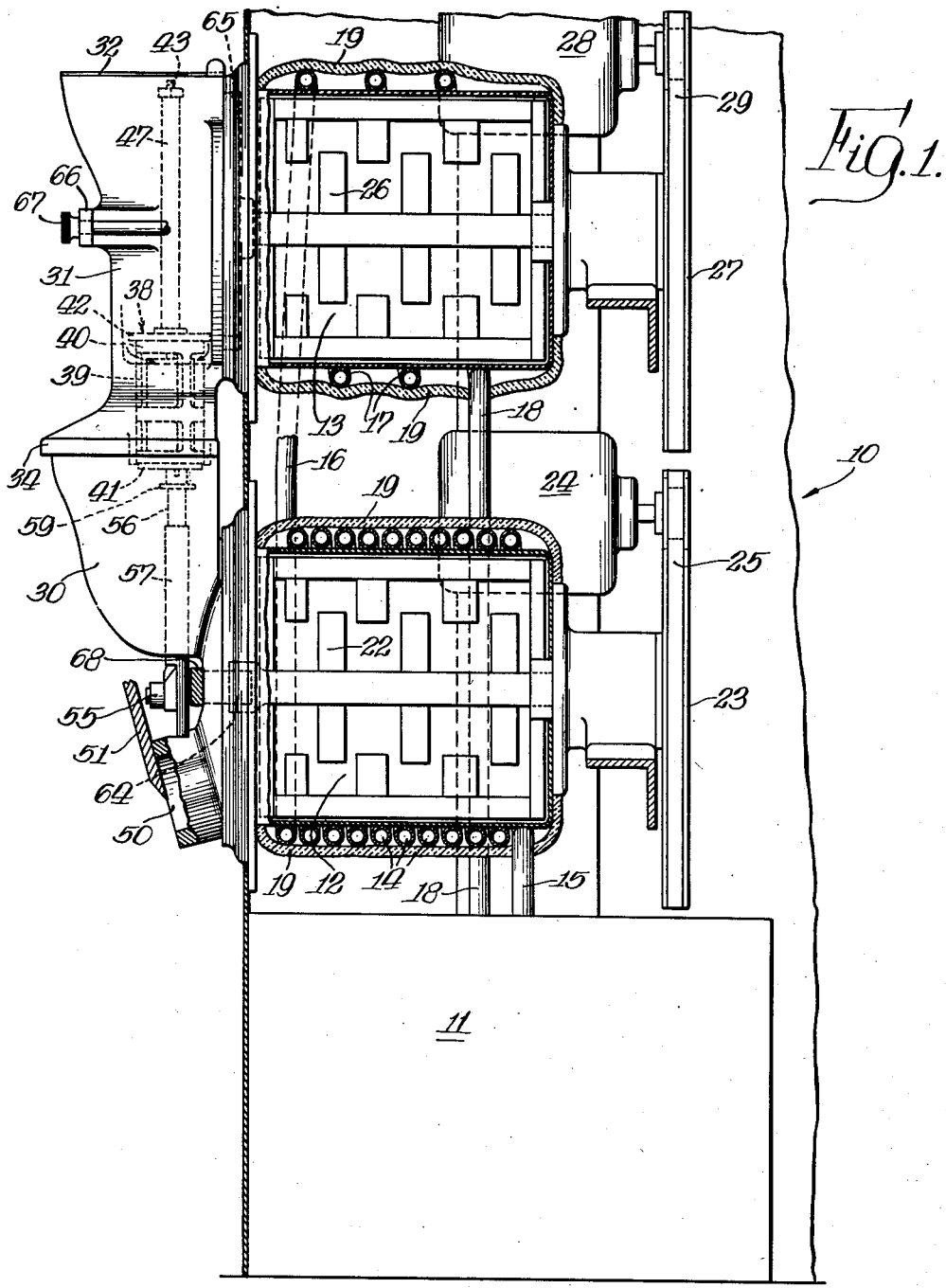
Fig. 1 illustrates a frozen custard machine in accordance with the invention with the storage and freezing chambers shown in cross-section.

In practicing the invention there is provided a machine for making frozen custard, soft ice-cream, or other frozen products, including a freezing chamber or cylinder which is cooled by a refrigerant passed through coils extending about the chamber. Mixing means are also provided in the chamber, being operated by a small motor. A storage chamber or cylinder is provided above the freezing chamber and coils for refrigerant are also provided about this chamber. These coils keep the mixture to be frozen at a cool temperature but do not cool the mixture enough for it to freeze. An agitator may be provided in the storage chamber for reconstituting the mix maintained therein. Cover plates are provided for the freezing and storage chambers with the cover plates being constructed to fit together to provide a complete enclosure. A valve is provided in the cover plate for the storage chamber for controlling the flow of mixture therefrom into the cover plate for the freezing chamber and from this into the freezing chamber itself. A gate is provided on the enclosure for the freezing chamber to permit withdrawal of the frozen mixture therefrom. A mechanical linkage is provided between the gate and the valve for automatically supplying mixture from the storage chamber to the freezing chamber as the frozen mixture is withdrawn from the freezing chamber.

Referring now to the drawings, in Fig. 1 there is illustrated a frozen custard machine in accordance with the invention. The frozen custard machine 10 includes refrigerating means 11, a freezing chamber 12, and a storage chamber 13. The freezing chamber 12 and storage chamber 13 may be of generally similar construction being cylindrical chambers having refrigerating coils positioned thereabout. The coils 14 about the freezing chamber are connected to the refrigerating system 11 by the supply line 15. The refrigerant after passing about the coils 14 continues through the line 16 to the coils 17 about the storage chamber. Refrigerant is then returned to the refrigerating system through the return line 18. Insulating means as indicated at 19 may be provided about the assembly including the chamber and refrigerating coils to insulate the same from the heat produced by the refrigerating system and the motors, and heat which may be introduced from any outside source.

A beater structure 22 is provided in the freezing chamber for stirring the mixture as it freezes to provide the proper texture thereof. The beater structure is connected to a pulley 23 driven by motor 24 through belt 25. Individual controls may be provided for the motor 24 for operating the beater as desired. The storage chamber 13 may also include a beater or agitator 26 which is connected to pulley 27 driven by motor 28 through the belt 29. The agitator 26 permits stirring of the mixture in the storage chamber 13 as will be more fully explained.

A cover member 30 is provided for the open end of the cylindrical freezing chamber 12 and similarly a cover chamber 31 is provided for the open end of the cylindrical storage chamber 13. These cover members are shown more clearly in Figs. 2 and 3. The cover members 31 has a removable lid 32 which may be opened to permit the placing of the mixture to be frozen into the cavity 33 in the cover member 31, from where it flows into the storage chamber 13. This may be a prepared mixture ready for freezing or may be the ingredients from which the mixture is to be made. If the ingredients when placed in the storage chamber are not mixed, the agitator 26 may be operated to reconstitute or prepare the mixture for freezing. Also after the mixture has been held in the storage chamber for a relatively long time it may be desired to stir the mixture to be sure that the ingredients are properly combined.

The cover member 31 fits on top of the cover member 30 and has a projecting edge 34 surrounding the top edge 35 of the member 30. A passage 36 is provided in the member 31 which communicates with the cavity 37 in the cover member 30 to provide for the flow of mixture from the storage chamber 13 to the freezing chamber 12. A valve structure 38 is provided in the opening 36 to control the flow of the mixture. The valve includes a cylindrical shell 39 having an integral top portion 40 and a removable bottom plate 41. A top plate 42 is positioned on top of the shell with the various members being secured together by bolt 43 threaded into the bottom plate 41. The bolt is threaded into a nut 44 positioned above the top member 42 by the cylindrical spacer 47, the purpose of which will be described more in detail. The bottom surface 45 of the top plate 42 and the top surface 46 surrounding the opening 36 are ground to provide a very tight fit so that the mixture cannot leak through the valve when the valve is closed.

The operation of the valve assembly 38 is described in detail in my copending application referred to above. The operation of this valve generally is apparent from a comparison of Figs. 1 and 3. In Fig. 1 the valve is open so that the mixture from the cavity 33 flows in through the openings in the shell 38 when the shell is lifted. This is illustrated by the arrows in Fig. 1. The amount of mixture which can flow into the valve depends upon the cubical space within the shell which may be reduced by the use of an insert 48 within the shell. When the valve is allowed to drop to the position shown in Fig. 3, the mixture therein can flow into the cavity 37 as illustrated by the arrows in Fig. 3.

The cover member 30 has an opening 50 therein through which the frozen mixture may be withdrawn from the freezing chamber 12. The opening 50 is closed by gate 51 having a handle 52 to be engaged by the operator for opening the gate. The gate 51 includes an upper projection 53 having an overhanging lip 54 which engages a roller 55 to operate a plunger 56. The plunger 56 is slidably positioned in a cylindrical tube 57 which may be formed integrally with the container 30 or may be secured thereto in any suitable manner. A spring 58 bears against a projecting rim 59 on the plunger 56 and a rim 60 on the tube 57 to tend to hold the plunger 56 in an upward position. The top surface 61 of the plunger bears against the bottom surface of the bottom plate 41 of the valve assembly so that when the gate 50 is opened by the handle 52 the plunger will cause the valve to move to the upper position and be filled with the mixture. Then when the gate is closed the projection 54 on the gate bearing against the roller 55 on the plunger 56 will cause the plunger to be pulled down and allow the valve to drop so that the mixture therein will be discharged into the cavity 37 and may flow from the cavity to the freezing chamber 12.

As the valve assembly 38 fits quite closely within the cylindrical opening 36 in the cover member 30, air within the valve structure will tend to prevent the flow of mixture therein when the valve is in the upper position. This condition has been eliminated by the use of the cylindrical spacer 47 surrounding the rod 43. It will be seen that clearance is provided about the rod so that air may escape from the inside of the valve through the passage between the spacer and the rod and escape through the slot 49 in the nut 44. The spacer extends above the level of the mixture in the cavity 33 so that the slot 49 is not filled with the mixture and the escape of air thereby impeded.

The mixture which enters the cavity 37 in the cover member 30 enters the freezing chamber through the opening 70 in the cover member. A removable baffle 71 is provided for partially closing this opening when the machine is used for making certain kinds of frozed mixtures. For example, the baffle is used when making frozen custard but is not necessary when making ice-cream. The baffle 71 is held in position by fingers 72 extending over the edge of the cover member 30. A clip 73 supported on the tube 57 also bears against the baffle 71 to hold it in place.

The cover member 30 is held in position to close the chamber 12 by bar 68 secured to the cover member and engaging bolts 69 projecting from the front of the freezer machine. A pin 64 is provided on the cover member 30 for supporting the forward end of the beater or agitator 22. The cover member 31 is similarly secured to the freezing machine proper by bar 66 cooperating with bolts 67 projecting from the front of the freezer. An inverted Y-shaped member 65 is provided at the opening of the storage chamber 13 for supporting the forward end of the beater or agitator 26. The member 65 is held in position by the cover member 31.

The freezer structure disclosed provides a freezing machine which may be operated continuously and automatically and which provides a supply of a frozen product at any desired rate. The storage chamber provides a relatively large capacity so that it will not be necessary to refill the freezer or make up a new mix at frequent intervals. No extra facilities are required for cooling the storage chamber as the refrigerating system required for freezing the mixture can provide the small additional amount of cooling required for maintaining the storage chamber at the desired low temperature. The provision of an agitator in the storage chamber makes it possible to keep the mix properly stored or to reconstitute or make up a new mix if desired.

The frozen custard machine is easily operated by relatively unskilled persons. Cleaning of the machine is easily accomplished as the cover members are easily removable and are of such configurations that sterilization thereof is simplified. The entire valve assembly can be lifted out by using the spacer 47 as a handle so that any mixture in the storage chamber will drain through the freezing chamber and may be withdrawn through the gate 51.

While there have been described certain embodiments of the invention which are illustrative thereof, it is obvious that various changes and modifications can be made therein without departing from the intended scope of the invention as defined in the appended claims.

I claim:

1. In a frozen custard machine including cabinet and refrigeration means within the cabinet, a freezing chamber within said cabinet for freezing a prepared mixture, a storage chamber for said mixture within said cabinet and positioned above said freezing chamber, a first coil positioned about said freezing chamber, a second coil positioned about said storage chamber, said coils being connected to said refrigeration means so that said chambers are cooled with said freezing chamber being cooled to a lower temperature than said storage chamber, removable cover means communicating with each of said chambers and having a passage therein for interconnecting said storage chamber and said freezing chamber, a metering valve in said passage for controlling the flow of mixture therebetween, said cover means having a discharge opening therein for removing frozen mixture from said freezing chamber, a gate removably closing said opening in said cover means, and means within said cover means interconnecting said gate and said metering valve for operating said metering valve to receive a predetermined quantity of mixture from the storage chamber upon opening said gate and for discharging the predetermined quantity of mixture into said freezing chamber upon closing said gate.

2. A frozen custard machine including a cabinet, a freezing chamber within said cabinet for freezing a prepared mixture, a storage chamber for said mixture within said cabinet and positioned above said freezing chamber, refrigeration means having a portion thereof about said freezing chamber and a smaller portion thereof about said storage chamber for cooling the same with said freezing chamber being cooled to a lower temperature than said storage chamber, means forming a passage connecting said storage chamber and said freezing chamber, a metering valve in said passage for transferring a fixed quantity of said mixture from said storage chamber to said freezing chamber each time said valve is operated, said freezing chamber having a discharge opening therein, a gate removably closing said opening in said freezing chamber, and means interconnecting said gate and said metering valve for operating said metering valve to receive a predetermined quantity of mixture from said storage chamber upon opening said gate and for discharging the predetermined quantity of mixture into said freezing chamber upon closing said gate.

3. A frozen custard machine including a freezing chamber for freezing a prepared mixture, a storage chamber for said mixture positioned above said freezing chamber, refrigeration means having a portion thereof about said freezing chamber and a smaller portion thereof about said storage chamber for cooling the same, with said freezing chamber being cooled to a lower temperature than said storage chamber, removable cover means communicating with each of said chambers and having a passage therein for connecting said storage chamber and said freezing chamber, a metering valve in said passage for transferring a fixed quantity of said mixture from said storage chamber to said freezing chamber each time said valve is operated, said freezing chamber having a discharge opening therein, a gate removably closing said opening in said freezing chamber, and means interconnecting said gate and said metering valve for operating said metering valve to receive a predetermined quantity of mixture from said storage chamber upon opening said gate and for discharging the predetermined quantity of mixture into said freezing chamber upon closing said gate.

4. A frozen custard machine comprising a cabinet, a first cylindrical chamber in said cabinet for freezing a prepared mixture, a second cylindrical chamber in said cabinet positioned above said first chamber for storing said mixture, means for cooling said first and second chambers, a first readily removable cover member for said first chamber having a cavity therein for receiving mixture to be admitted to said first chamber, said cover member having a discharge opening therein for withdrawing frozen mixture therefrom, a gate for closing said opening, a second readily removable cover member for said second chamber having a cavity therein for receiving mixture to be admitted to said second chamber, said second cover member having an opening communicating with said cavity in said first cover member to provide a passage for mixture from said second chamber into said first chamber, a metering valve in said opening in said second cover member for controlling the flow of mixture therethrough, said valve transferring a fixed quantity of said mixture from said second chamber to said first chamber each time said valve is operated, and means interconnecting said gate and said metering valve for operating said metering valve to receive a predetermined quantity of mixture from said second chamber upon opening said gate and for discharging the predetermined quantity of mixture into said first chamber upon closing said gate.

5. A frozen custard machine comprising a cabinet, a first cylindrical chamber in said cabinet for freezing a prepared mixture, a second cylindrical chamber in said cabinet positioned above said first chamber for storing said mixture, refrigeration means for cooling said first and second chambers, agitator means in said first and second chambers for stirring the mixture therein, individual motor means for driving said agitator means, a first readily removable cover member for said first chamber having a cavity therein for receiving mixture to be admitted to said first chamber, said cover member having a discharge opening therein for withdrawing frozen mixture therefrom, a gate for closing said opening, a second readily removable cover member for said second chamber having a cavity therein for receiving mixture to be admitted to said second chamber, said second cover member having an opening communicating with said cavity in said first cover member to provide a passage for mixture from said second chamber into said first chamber, a metering valve in said opening in said second cover member for controlling the flow of mixture therethrough, and mechanical means supported on said first cover member interconnecting said gate and said metering valve for operating said metering valve to receive a predetermined quantity of mixture from said second chamber upon opening said gate and for discharging the predetermined quantity of mixture into said first chamber upon closing said gate.

6. A frozen custard machine comprising a cabinet, first and second cylindrical chambers in said cabinet with the axes thereof positioned horizontally and said second cylindrical chamber being positioned above said first cylindrical chamber, said chambers having open ends at a vertical plane which coincides with one wall of said cabinet, means for cooling said chambers with said first chamber being cooled to a temperature for freezing a mixture and said second chamber being cooled to a temperature for storing said mixture, a first readily removable cover member for said first chamber having a cavity therein for receiving mixture to be admitted to said first chamber, said cover member having a discharge opening therein for withdrawing frozen mixture therefrom, a gate for closing said opening, a second readily removable cover member for said second chamber having a cavity therein for receiving mixture to be admitted to said second chamber, said second cover member having an opening communicating with said cavity in said first cover member to provide a passage for mixture from said second chamber into said first chamber, a metering valve in said opening in said second cover member for controlling the flow of mixture therethrough, and means interconnecting said gate and said metering valve for operating said metering valve to receive a predetermined quantity of mixture from said second chamber upon opening said gate and for discharging the predetermined quantities of mixture into said first chamber upon closing said gate.

7. A frozen custard machine including a freezing chamber for freezing a prepared mixture, a storage chamber for said mixture positioned above said freezing chamber, means forming a passage connecting said storage chamber and said freezing chamber, a valve in said passage having a cavity therein for receiving said mixture from said storage chamber and transferring the same to said freezing chamber each time said valve is operated, said valve including a portion extending above the level of the mixture in said storage chamber having an air passage therein extending from said cavity in said valve to the air above said mixture, a gate for said freezing chamber for drawing off the frozen mixture therefrom, and means connecting said gate and said valve for automatically operating said valve to transfer said mixture from said storage chamber to said freezing chamber to keep said freezing chamber filled.

8. A frozen custard machine including a freezing chamber for freezing a prepared mixture, a storage chamber for said mixture positioned above said freezing chamber, cover means for said chambers having a passage therein for interconnecting said storage chamber and said freezing chamber, a metering valve in said passage having a cavity therein for receiving a fixed quantity of said mixture from said storage chamber and transferring the same to said freezing chamber each time said valve is operated, an insert in said cavity for reducing the volume thereof, said freezing chamber having a discharge opening therein for removing the frozen mixture therefrom, a gate removably closing said discharge opening in said freezing chamber, and means interconnecting said gate and said metering valve for operating said metering valve to receive a predetermined quantity of mixture from the storage chamber upon opening said gate and for discharging the predetermined quantity of mixture into said freezing chamber upon closing of said gate.

BEN H. WOODRUFF.

REFERENCES CITED

The following references are of record in the file of this patent:

UNITED STATES PATENTS

| Number | Name | Date |
| --- | --- | --- |
| 1,407,044 | Thompson | Feb. 21, 1922 |
| 1,951,365 | Morrow | Mar. 20, 1934 |
| 1,965,617 | Vogt | July 10, 1934 |
| 1,993,130 | Ballew | Mar. 5, 1935 |
| 2,000,730 | Wortmann | May 7, 1935 |